April 18, 1933. W. C. BAILEY 1,904,776
COMBINATION THERMOMETER CASING
Filed Oct. 16, 1931 2 Sheets-Sheet 1
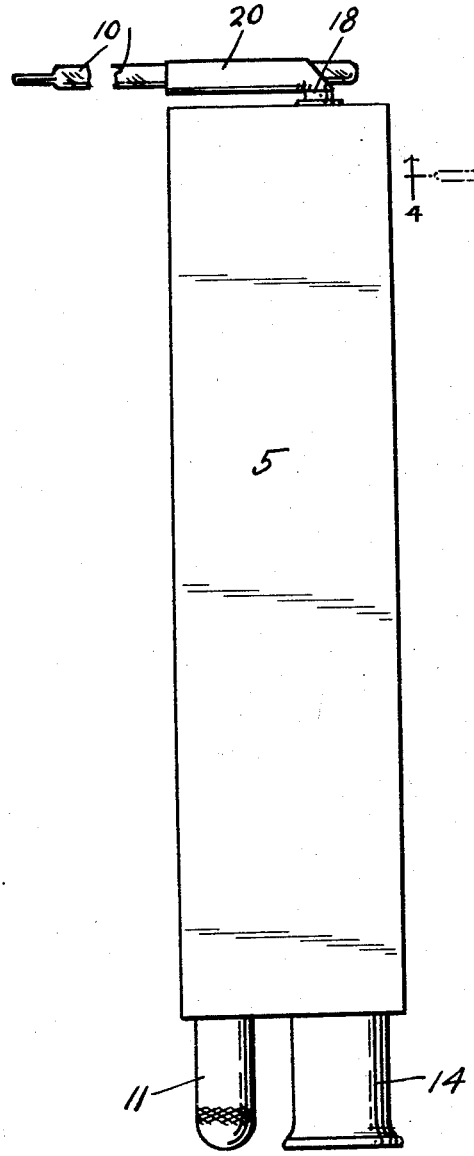
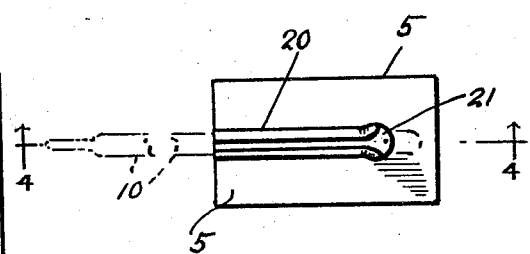
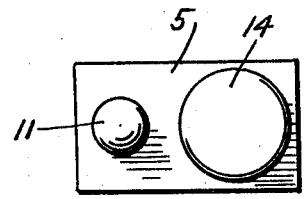
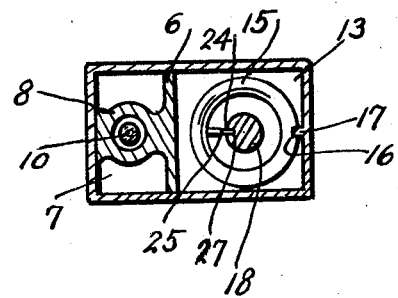
Inventor
William C. Bailey
By Clarence A. O'Brien
Attorney

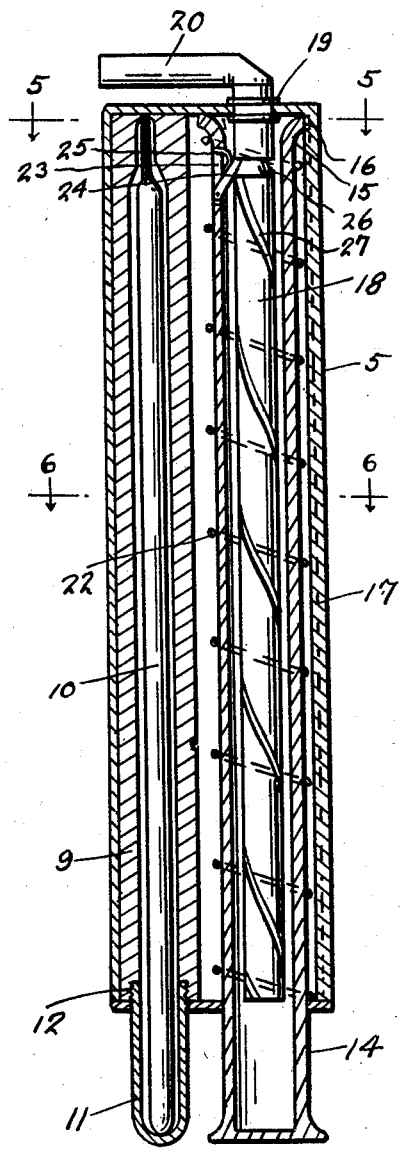
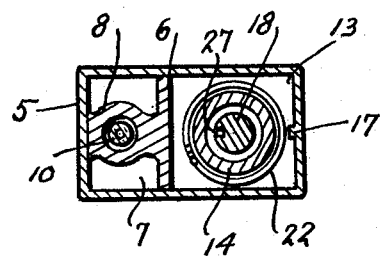
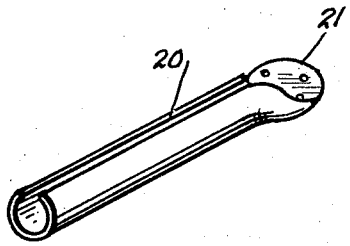
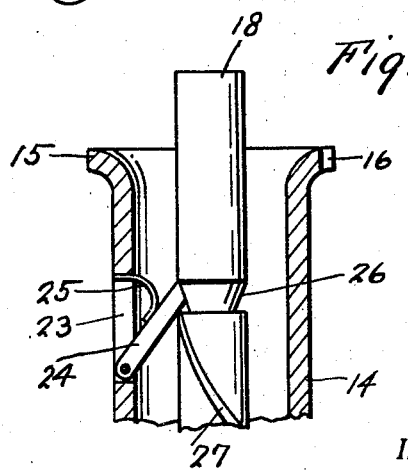

Patented Apr. 18, 1933

1,904,776

UNITED STATES PATENT OFFICE

WILLIAM C. BAILEY, OF LOS ANGELES, CALIFORNIA

COMBINATION THERMOMETER CASING

Application filed October 16, 1931. Serial No. 569,299.

This invention relates to casings for thermometers, and the primary object of the invention is to provide a casing for accommodating the thermometer especially clinical thermometers when the same is not in use, together with means for restoring the thermometer to its original low reading.

A still further object of the invention is to provide means for subjecting clinical thermometer to the action of centrifugal force for restoring the original low reading of the thermometer.

Other objects and advantages of the invention will become apparent from a study of the following description, taken in connection with the accompanying drawings wherein:

Figure 1 is an elevational view of the device.

Figure 2 is a top plan view thereof.

Figure 3 is a bottom plan view thereof.

Figure 4 is a longitudinal sectional view taken on the line 4—4 of Figure 2.

Figures 5 and 6 are transverse sectional views taken substantially on the lines 5—5 and 6—6 respectively of Figure 4.

Figure 7 is a perspective view of a spring clip.

Figure 8 is a fragmentary sectional elevational view of the upper portions of a tube and spirally grooved shaft forming a part of the means for returning the thermometer to original low reading.

With reference more in detail to the drawings, it will be seen that the invention has as its preferred embodiment thereof, and as shown, comprises a shell like casing 5 formed of suitable material, and of suitable dimensions. Casing 5 is provided into two compartments elongated longitudinally through the medium of a partition 6. In one of the compartments, for example the compartment 7, there is provided a body 8 constituting a thermometer holder and provided with a longitudinal bore 9 for accommodating a conventional type of clinical thermometer 10. To retain the thermometer 10 within the bore of the holder 8 there is provided for said holder a catch 11 that is screw threadedly engaged to one end of the holder 8 as at 12.

Longitudinally slidable in the other of the compartments, namely the compartment 13 is a tube 14 closed at one end having said one end normally extending through the wall of the casing 5 at the corresponding end of the casing. At its inner open end, the tube 14 is flared outwardly as at 15 and the flared end 15 is provided with a notch 16 engaging a guide rib 17 provided on the wall of the casing 5 whereby the tube 14 is constrained to slide longitudinally of the casing 5, and is retained against rotation relative to the casing.

A rotatable shaft 18 is arranged in the tube 14 and one end of the shaft extends through the casing 5 at that end of the casing remote from the closed end of the tube 14. The extended end of the shaft 18 is provided with inner and outer collars 19 whereby the shaft is supported in a rotatable manner.

A spring clip 20 comprises a longitudinally split tubular body portion at one end merging into an attaching plate 21 that is secured by any suitable fastening element to the outer end of shaft 18 as clearly suggested in the drawings. The tube 20 is adapted to receive in fixed cylindrical portion thereof one end of the thermometer 10 so as to rotate this shaft 18 by action of centrifugal force the mercury in the thermometer will be shifted to return to the original or normal low reading.

As shown to advantage in Figure 4, the tube 14 is normally urged inwardly of the compartment 13 through the medium of a coil spring 22 disposed about the tube 14, and one end of the coil spring bears against an adjacent end wall of the casing 5 while the other end of the coil spring engages the flared end 16 of the tube. Adjacent the flared end 15, the tube 14 at the periphery thereof is provided with an opening 23 through which is swingable a pivoted dog 24 normally urged inwardly of the tube through the medium of a spring 25.

When the parts are in their normal position that is in the position shown in Figure 4, the beveled free end of the dog 24 engages a circumferentially extending groove 26 provided at the upper end of the shaft 18. Communicating with the groove 26 is the upper end of a spiral groove 27 that extends from the groove 26 to the lowermost end of the shaft 18.

Now assuming, that the clinical thermometer 10 has been used, for a purpose apparent, the doctor or attendant places the thermometer in the lip 20, and grasping the outer end of the tube 14 with one hand pulls on the tube against the action of the spring 23, whereby the dog 24 and groove 26 will move into the spiral groove 27 causing the shaft 18 to rotate at sufficient speed, as to cause the mercury in the tube by centrifugal force to be shifted for returning to its normal or "low reading" position.

Upon release of the tube 14, the same under action of spring 25 will move inwardly of the casing 5 and obviously the dog 24, when the tube has returned to its normal position, will reengage groove 26.

In placing the thermometer in the spring clip or holder 20, care should be taken to push the top or upper end of the thermometer through the cylindrical portion of the clip to a position as near the shaft as possible, thrusting the mercury bulb of the thermometer as far as possible from the center of motion to obtain the best results.

After the thermometer has been returned to its original low reading, the same may be moved from the clip 20 and then inserted in the bore of the holder 8 and the cap 11 and threadedly engaged with the holder for maintaining the thermometer encased.

Even though I have herein shown and described the preferred embodiment of the invention, it is to be understood that the same is susceptible of further changes, modifications and improvements coming within the scope of the appended claims.

Having thus described my invention, what I claim as new is:

1. A thermometer case comprising in combination a pair of compartments, one of said compartments being adapted to contain a thermometer, a spirally threaded shaft rotatably mounted in the other of said compartments, normally retracted means movable longitudinally of the last named compartments and adapted for engagement with the spiral tread of said shaft to rotate the latter, and means for mounting a thermometer at right angles to said shaft.

2. In a device of the character described, a casing, a shaft rotatably mounted in the casing, a tubular member receiving said shaft and constrained to shift longitudinally of said casing, spring means engaged with the tubular member and yieldably retaining the latter retracted, inter-engaging means on said shaft and on said tubular member for rotating the shaft upon longitudinal shifting movement of said tubular member, and an article holding clip connecting with said shaft and extending at right angles thereto.

3. In a thermometer case, a compartment elongated longitudinally, a shaft rotatably mounted in said compartment, a tubular member receiving said shaft, inter-engaging means on said tubular member and the wall of said compartment to retain said tubular member against rotation, spring means normally urging said tubular member longitudinally in one direction, and inter-engaging means on said tubular member and on said shaft for rotating the latter upon longitudinal shifting movement of the tubular member, and means for mounting a thermometer at right angles to said shaft.

4. A thermometer case comprising in combination a rotatably mounted shaft, a tubular member receiving the shaft and constrained to shift longitudinally thereof, spring means engaged with the tubular member and normally urging the same to shift longitudinally in one direction, said shaft being provided with a spiral thread, and a pivoted pawl carried by said tubular member and engaging said thread for rotating the shaft upon shifting movement of the tubular member; and a spring clip mounted on said shaft for holding a thermometer at right angles to the shaft.

5. In a device of the character described, a casing provided with two compartments, one of which is adapted to contain a thermometer and the other of which is adapted to contain a rotatable shaft, a shaft in the latter compartment equipped with means for engaging the thermometer to retain the latter at an angle to the shaft, and means for rotating the shaft for subjecting the thermometer to centrifugal force for the purpose of restoring the original low reading of the thermometer.

In testimony whereof I affix my signature.

WILLIAM C. BAILEY.